(12) United States Patent
Goldthwaite et al.

(10) Patent No.: US 7,146,574 B2
(45) Date of Patent: Dec. 5, 2006

(54) SYSTEMS AND METHODS FOR INTERFACING WITH DIGITAL HISTORY DATA

(75) Inventors: Flora P. Goldthwaite, Seattle, WA (US); Jonathan C. Cluts, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 626 days.

(21) Appl. No.: 10/032,309

(22) Filed: Dec. 21, 2001

(65) Prior Publication Data

US 2003/0118087 A1 Jun. 26, 2003

(51) Int. Cl.
*G06F 3/00* (2006.01)
(52) U.S. Cl. ..................................................... 715/838
(58) Field of Classification Search ................ 715/855, 715/833, 835, 854, 838, 804, 744, 767, 727, 715/760, 764, 716, 751, 720, 776, 772, 730; 707/6, 104.1
See application file for complete search history.

(56) References Cited

U.S. PATENT DOCUMENTS

| | | | | |
|---|---|---|---|---|
| 5,414,644 A * | 5/1995 | Seaman et al. | ............. | 702/183 |
| 5,723,184 A * | 3/1998 | Yamamoto | .................. | 427/565 |
| 5,892,507 A * | 4/1999 | Moorby et al. | .......... | 715/500.1 |
| 5,977,974 A * | 11/1999 | Hatori et al. | ................ | 715/839 |
| 6,014,135 A * | 1/2000 | Fernandes | ................... | 715/744 |
| 6,034,683 A * | 3/2000 | Mansour et al. | ............ | 715/764 |
| 6,064,984 A * | 5/2000 | Ferguson et al. | ............. | 705/36 |
| 6,144,375 A * | 11/2000 | Jain et al. | ................. | 715/500.1 |
| 6,154,600 A * | 11/2000 | Newman et al. | ................ | 386/4 |
| 6,204,840 B1* | 3/2001 | Petelycky et al. | ........ | 715/500.1 |
| 6,317,739 B1* | 11/2001 | Hirata et al. | ................... | 707/4 |
| 6,333,752 B1* | 12/2001 | Hasegawa et al. | .......... | 715/764 |
| 6,351,765 B1* | 2/2002 | Pietropaolo et al. | ........ | 709/218 |
| 6,366,303 B1* | 4/2002 | Venolia | ...................... | 715/856 |
| 6,452,615 B1* | 9/2002 | Chiu et al. | ................... | 715/776 |
| 6,525,746 B1* | 2/2003 | Lau et al. | .................... | 715/725 |
| 6,567,983 B1* | 5/2003 | Shiimori | ..................... | 725/105 |
| 6,570,582 B1* | 5/2003 | Sciammarella et al. | ..... | 345/660 |
| 6,628,303 B1* | 9/2003 | Foreman et al. | ............ | 715/723 |

(Continued)

OTHER PUBLICATIONS

Dionisio, J.D.N. et al., "A Unified Timeline Model and User Interface for Multimedia Medical Databases," *Computerized Medical Imaging and Graphics*, 1996, 20(4), 333-346.

(Continued)

*Primary Examiner*—Kristine Kincaid
*Assistant Examiner*—Lê Nguyen
(74) *Attorney, Agent, or Firm*—Woodcock Washburn LLP

(57) ABSTRACT

Systems and methods for accessing historical data are provided. Based upon user interaction, a time period of interest and historical data, the systems and methods perform cross-correlation algorithms and interpret which items are to be accessed and displayed to the user via a user interface vis-a-vis a timeline portion and navigation region. Based on frequency and recency usage patterns, and/or user preferences, items are assigned relative weights and displayed accordingly in the timeline portion and navigation region of the user interface. Each item that can be displayed within the system has a unique identification, which may be translated to one or more visual symbols within the user interface. In various non-limiting embodiments, the system leverages a distributed database store which stores and indexes items that make up a digital history. When a request is made to the database, items, such as events, places, people and things, are automatically cross-referenced and correlations are drawn based on filtering criteria.

41 Claims, 10 Drawing Sheets
(7 of 10 Drawing Sheet(s) Filed in Color)

U.S. PATENT DOCUMENTS

| | | | |
|---|---|---|---|
| 6,661,438 B1* | 12/2003 | Shiraishi et al. | 715/835 |
| 6,667,751 B1* | 12/2003 | Wynn et al. | 715/833 |
| 6,833,848 B1* | 12/2004 | Wolff et al. | 715/719 |
| 6,996,782 B1 | 2/2006 | Parker et al. | 715/764 |
| 2001/0013068 A1* | 8/2001 | Klemets et al. | 709/231 |
| 2001/0020981 A1* | 9/2001 | Jun et al. | 348/426.1 |
| 2002/0002562 A1* | 1/2002 | Moran et al. | 707/500 |
| 2002/0012526 A1* | 1/2002 | Sai et al. | 386/69 |
| 2002/0075310 A1* | 6/2002 | Prabhu et al. | 345/764 |
| 2002/0075322 A1* | 6/2002 | Rosenzweig et al. | 345/835 |
| 2003/0043815 A1* | 3/2003 | Tinsley et al. | 370/395.21 |

OTHER PUBLICATIONS

Harada, S. et al., "Interactive Image Retrieval by Natural Language," *Optical Eng.*, 1997, 36(12), 3281-3287.

Ho, B.K.T. et al., "PACS Workstation Design," *Comp. Med. Imag. Graph.*, 1991, 15(3), 147-155.

Stanchev, P.L. et al., "An Approach to Image Indexing of Documents," *Visual Database Systems, II, Proceedings of the IFIP TC2/WG2.6 Second Working Conference*, 1992, A-7, 63-77.

Taniguchi, Y. et al., "SceneCabinet: A Video Indexing System Integrating Video Analysis Techniques," *Transactions of the Institute of Electronics, Information and Communication Engineers*, 2001, *J84(D-II; No. 6)*, 1112-1121 (English language abstract provided).

Williams, R. et al., "A High-Performance Active Digital Library," *Parallel Comp.*, 1998, 24(12-13), 1791-1806.

* cited by examiner

SYSTEMS AND METHODS FOR INTERFACING WITH DIGITAL HISTORY DATA

RELATED APPLICATION

The present invention relates to commonly assigned copending U.S. Appln. No. 10/075,519, filed Feb. 13, 2002, entitled "Methods and Systems for Providing a Distributed Database Store with Correlation Service."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document Copyright © 2001, Microsoft Corp.

FIELD OF THE INVENTION

The present invention relates to systems and methods for interfacing with digital history store(s). More particularly, the present invention provides systems and methods that can be utilized to interact with digitally stored historical data, such as events, places, people and things, as expressed through a timeline component and a navigation engine.

BACKGROUND OF THE INVENTION

Digital devices such as personal digital assistants (PDAs), cell phones, MP3 players, digital cameras, wireless devices and so on are available and gaining traction as essential digital devices. Other digital devices, such as personal computers, are already widely used as key digital devices for homes and businesses. At the same time, increased networking of such devices has resulted in increased connectivity of the functionality and data included in those devices. The result of the use of such networked digital devices is that users are generating unprecedented amounts of digital data from the various digital devices and computing applications, and that this unprecedented amount of data is becoming available from a variety of locations. For example, digital picture data can be captured by digital cameras and then be stored on a user's personal computer for access by a digital picture editing application. The same digital picture data may be available half way around the Earth from a computer that is networked to the user's personal computer as well. For another example, a calendar application provides a user with the ability to electronically control appointments and schedules. Other networked applications can access such calendar data as well. Thus, when digital historical data is stored in a distributed manner, but connected by way of a network, it can effectively be thought of as being in one place, whether distributed or in one place. Thus, many user interactive applications store digital histories accessible from a variety of locations. It is not obvious that all data stored that may be digital history data is recognized as such. For example, INTERNET EXPLORER® tracks a user's history of visited web sites. While this is not as straightforward of an example of a digital picture, a user's history of visited web sites is still rich with information about a user and the user's history. There are many more such application examples that electronically track user activity and generate temporally associated digital data as well.

Although users may access data and share data indirectly among various applications, the organization and harnessing of the data among the various applications would allow users to maximize the benefit from digitally recording activities. In particular, data that has an associated time reference could be cross-referenced to provide valuable information correlating a user's history or activity in time. No current technology provides storage and indexing for items making up a digitally recorded history consisting of various types of media and data. No current technology is capable of making complex associations between data, especially non-textual data such as audio and video. U.S. Appln. Ser. No. 10/075,519, filed Feb. 13, 2002, entitled "Methods and Systems for Providing a Distributed Database Store with Correlation Service" (the '519 application) teaches a novel way to integrate historical data stored in a distributed manner. However, presently, there is no intelligent means for leveraging such a distributed database store of which the systems of the '519 application are examples, from a computing device. Further, there is no current technology that is capable of making complex associations between data based on time, history, and items interacted with according to a common theme, such as by the same user. There is also no current technology that provides unique representation of user interface elements representing items of a digital history based on unique identification.

Thus, it would be advantageous to provide a graphical user interface (UI) that leverages the untapped power of a distributed database store. It would be further advantageous to provide a user interface that makes cross-correlations for events, places, people and things stored in a digital history. It would be desirable to display the events, places, people and things in a way that makes sense for a time period of interest specified via a timeline. It would be desirable to display the events, places, people and things in a navigation portion relating to the time period of interest in way that intuitively expresses a relative presence of the events, places, people and things in a user's life for the time period, where the navigation portion allows the user to quickly navigate to items of interest. It would be further desirable to provide intelligent defaults for displaying an object or time, and items related to the object or time that make sense for the user. It would be still further desirable to provide such a UI as a component that may be integrated into an operating system (OS), downloaded from a network location or into other applications that could make use of the UI component.

SUMMARY OF THE INVENTION

In view of the foregoing, the present invention provides systems and methods for accessing historical data. Based upon user interaction, a time period of interest and historical data, the systems and methods of the invention perform cross-correlation algorithms and interpret which items are to be accessed and displayed to the user via a user interface vis-a-vis a timeline portion and navigation region. Based on frequency and recency usage patterns, and/or user preferences, items are assigned relative weights and displayed accordingly in the timeline portion and navigation region of the user interface. Each item that can be displayed within the system has a unique identification, which may be translated to one or more visual symbols within the user interface. In various non-limiting embodiments, the system leverages a distributed database store which stores and indexes items that make up a digital history. When a request is made to the database, items, such as events, places, people and things, are automatically cross-referenced and correlations are drawn based on filtering criteria.

Other features and embodiments of the present invention are described below.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The system and methods for interfacing with digital history data are further described with reference to the accompanying drawings in which.

DETAILED DESCRIPTION OF THE INVENTION

Overview

Figure 1A:
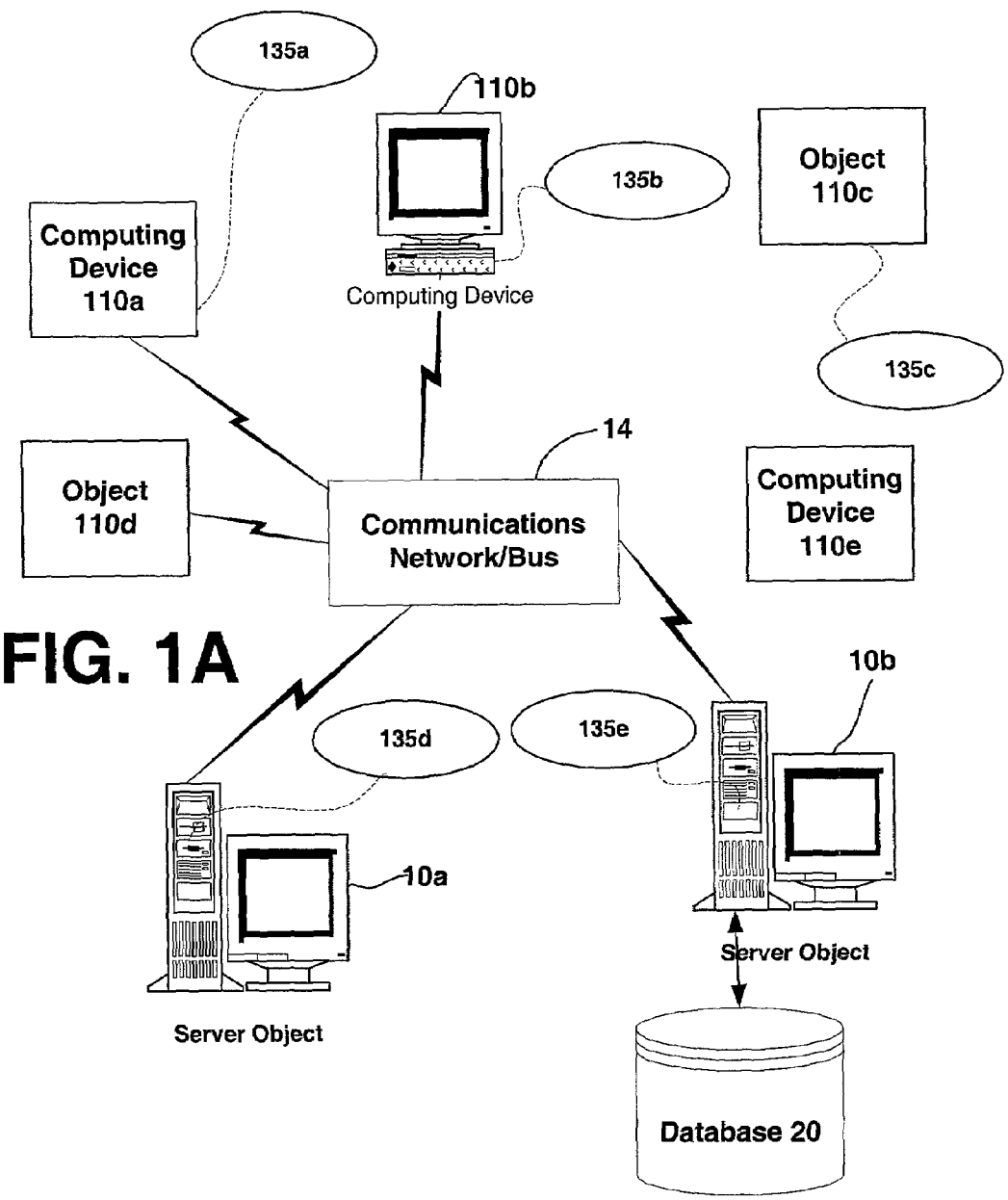
FIG. 1A is a block diagram representing an exemplary network environment having a variety of computing devices in which the present invention may be implemented.

The present invention provides a user interface that can leverage the existence of one or more database stores having a collection of user historical digital data. The digital data may be any type of data, of which multimedia are but one non-limiting example, and may come from any computing device or application. The present invention thus presumes the existence of one or more database stores, which may be of different types, examples of which are provided by the systems and methods of the 'ZZZ application described in the background. In leveraging such a historical digital data store, the invention provides a timeline view of events, places, people and things in a user's life and a navigation portion that provides intuitive navigation of the events, places, people and things in the user's life. The navigation is provided in a way that takes into account relative use of, activity with respect to and/or interest by the user in the displayed items.

In various non-limiting embodiments, the invention provides an application component, such as a component called "My History," which revolves around the ability to retrieve a user's history, information about the user and the items, such as events, places, people and things, about which the user cares. Since the application component is coupled to the relevant digital history store, this application component has access to all of the user's recorded history.

In non-limiting embodiments, a mechanism is provided for a user to navigate through the digital history on the basis of events, places, people and things. A timeline in the user interface provides the ability to navigate in time. Inputs are provided whereby a user may select the appropriate granularity of time. For example, the user can select a timeline view by the hour, the day, the week, etc. A scroll bar provides an input mechanism for moving through the digital history data in time. Icons representing various data records are displayed across the timeline in time order, and in the following categories: events, people, things and places. Items that exhibit predefined usage patterns, e.g., most recently, most frequently, etc. are shown with a more emphasized icon, such as larger or darker, to provide the user with a visual cue regarding usage patterns of the data. The application component effectively organizes, categorizes and displays the user's history into a user interface as explained in more detail below.

Exemplary Networked and Distributed Environments

One of ordinary skill in the art can appreciate that a computer or other client or server device can be deployed as part of a computer network, or in a distributed computing environment. In this regard, the present invention pertains to any computer system having any number of memory or storage units, and any number of applications and processes occurring across any number of storage units or volumes, which may make digital history services for a digital history store. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with digital history services.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may generate historical data for the interface techniques of the present invention.

FIG. 1A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 1A. In accordance with an aspect of the invention, each object 10a, 10b, etc. or 110a, 110b, 110c, etc. may contain an application that might have a user interface to a digital history store or an application that generates digital history data.

In a distributed computing architecture, computers, which may have traditionally been used solely as clients, communicate directly among themselves and can act as both clients and servers, assuming whatever role is most efficient for the network. This reduces the load on servers and allows all of the clients to access resources available on other clients, thereby increasing the capability and efficiency of the entire network. The user interfacing leveraging digital history data in accordance with the present invention may thus be distributed among clients and servers, acting in a way that is efficient for the entire network.

Distributed computing can help businesses deliver services and capabilities more efficiently across diverse geographic boundaries. Moreover, distributed computing can move data closer to the point where data is consumed acting as a network caching mechanism. Distributed computing also allows computing networks to dynamically work together using intelligent agents. Agents reside on peer computers and communicate various kinds of information back and forth. Agents may also initiate tasks on behalf of other peer systems. For instance, intelligent agents can be used to prioritize tasks on a network, change traffic flow, search for files locally or determine anomalous behavior such as a virus and stop it before it affects the network. All sorts of other services may be contemplated as well. Since digital history data may in practice be physically located in one or more locations, the management of applications requesting the use thereof is of great utility in such a system.

It can also be appreciated that an object, such as 110c, may be hosted on another computing device 10a, 10b, etc. or 110a, 110b, etc. Although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wireline or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and is accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet or another network. In short, a variety of disparate sources exist for the storage and transmission of data, and consequently, moving forward, computing devices will require ways of sharing data, such as digital history data accessed or utilized incident to the user interaction with the digital history data pursuant to the interfacing of the invention.

The Internet commonly refers to the collection of networks and gateways that utilize the TCP/IP suite of protocols, which are well known in the art of computer networking. TCP/IP is an acronym for "Transport Control Protocol/Interface Program." The Internet can be described as a system of geographically distributed remote computer networks interconnected by computers executing networking protocols that allow users to interact and share information over the networks. Because of such widespread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 1A, computers 110a, 110b, etc. can be thought of as clients and computers 10a, 10b, etc. can be thought of as the server where servers 10a, 10b, etc. maintain the data that is then replicated in or transmitted to the client computers 110a, 110b, etc.; it is understood that the client/server distinction can become less relevant in an environment, such as a peer to peer environment, where servers may also behave as clients and clients may behave as servers.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext Transfer Protocol (HTTP) is a common protocol that is used in conjunction with the World Wide Web (WWW) or, simply, the "Web." Typically, a computer network address such as a Universal Resource Locator (URL) or an Internet Protocol (IP) address is used to identify the server or client computers to each other. The network address can be referred to as a URL address. For example, communication can be provided over a communications medium 14. In particular, the client and server may be coupled to one another via TCP/IP connections for high-capacity communication.

Thus, FIG. 1A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to provide a user interface to digital history data.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, etc., as may be characteristic of a distributed computing environment. Communications may be wired or wireless, where appropriate. Client devices 110a, 110b, 110c, etc. may or may not communicate via communications network/bus 14, and may have independent communications associated therewith. For example, in the case of a TV or VCR, there may or may not be a networked aspect to the control thereof. Each client computer 110a, 110b, 110c, etc. and server computer 10a, 10b, etc. may be equipped with various application program modules or objects 135a, 135b, 135c, 135d, 135e and with connections or access to various types of storage elements or objects, across which files may be stored or to which portion(s) of files may be downloaded or migrated. Any computer 10a, 10b, 110a, 110b, etc. may be responsible for the maintenance and updating of a database 20 or other storage element in accordance with the present invention, such as a database or memory 20 for storing digital history data. Thus, the present invention can be utilized in a computer network environment having client computers 110a, 110b, etc. that can access and interact with a computer network/bus 14 and server computers 10a, 10b, etc. that may interact with client computers 110a, 110b, etc. and other devices 111 and databases 20.

Exemplary Computing Device

Figure 1B:
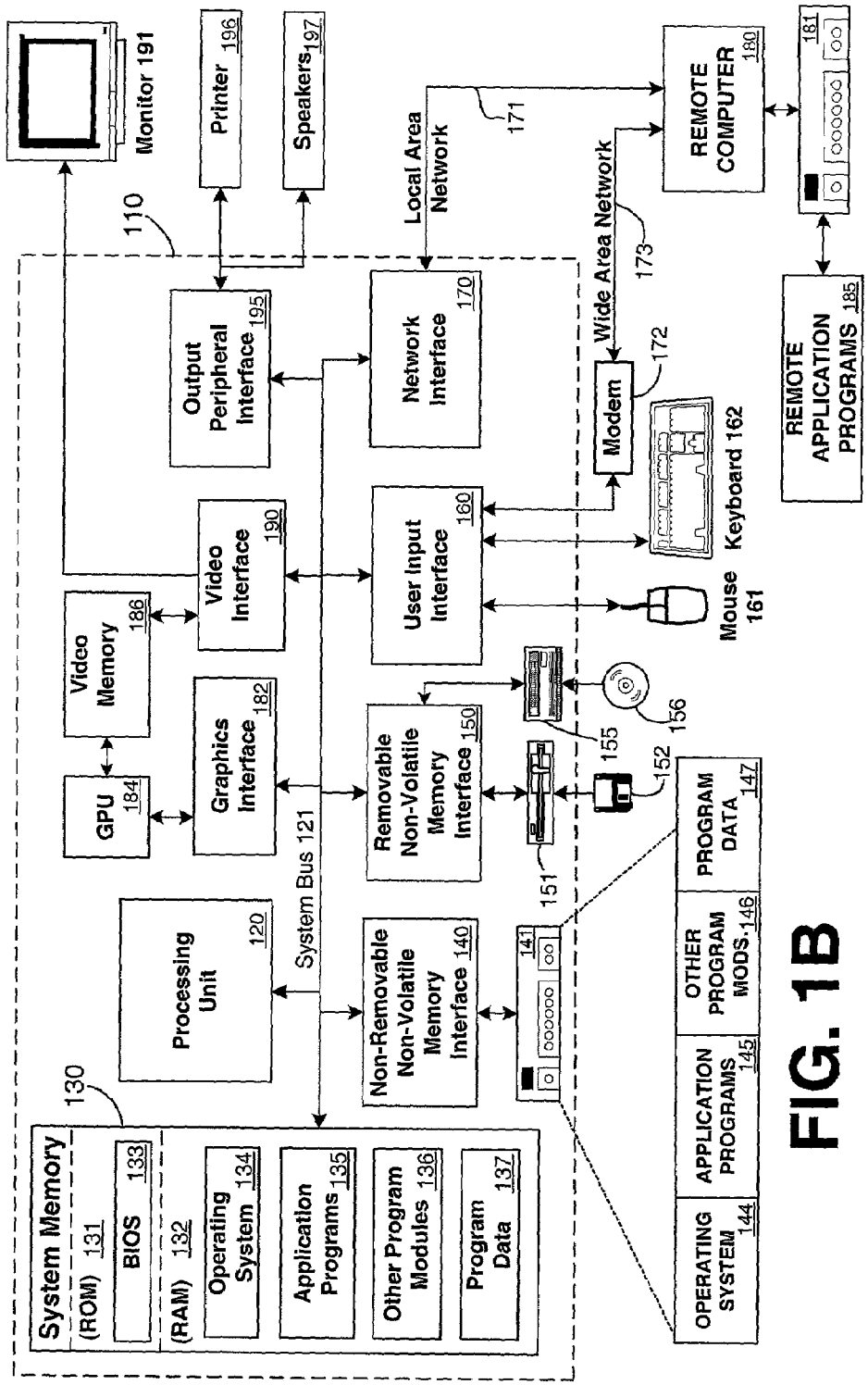
FIG. 1B is a block diagram representing an exemplary nonlimiting computing device in which the present invention may be implemented.

FIG. 1B and the following discussion are intended to provide a brief general description of a suitable computing environment in which the invention may be implemented. It should be understood, however, that handheld, portable and other computing devices and computing objects of all kinds are contemplated for use in connection with the present invention. While a general purpose computer is described below, this is but one example of a computing device, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved is a desirable, or suitable, environment for operation of the user interfacing of the invention.

Although not required, the invention can be implemented via an operating system, for use by a developer of services for a device or object, and/or included within application software that interfaces to a digital history store. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, handheld or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1B illustrates operating system 134, application programs 135, other program modules 136, and program data 137.

The computer 110 may also include other removable/non-removable, volatile/nonvolatile computer storage media. By way of example only, FIG. 1B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1B provide storage of computer readable instructions, data structures, program modules and other data for the computer 110. In FIG. 1B, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for AGP communications. One or more graphics processing units (GPUs) 184 may communicate with graphics interface 182. In this regard, GPUs 184 generally include on-chip memory storage, such as register storage and GPUs 184 communicate with a video memory 186. The invention may be described more generally in connection with any coprocessor, of which GPUs 184 are but one example. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1B. The logical connections depicted in FIG. 1B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1B illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .Net platform includes servers, building-block services, such as Web-based data storage and downloadable device software. Generally speaking, the .Net platform provides (1) the ability to make the entire range of computing devices work together and to have user information automatically updated and synchronized on all of them, (2) increased interactive capability for Web sites, enabled by greater use of XML rather than HTML, (3) online services that feature customized access and delivery of products and services to the user from a central starting point for the management of various applications, such as e-mail, for example, or software, such as Office .Net, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform integration features as well.

While exemplary embodiments herein are described in connection with software residing on a computing device, one or more portions of the invention may also be implemented via an operating system or a "middle man" object between an application and a digital history store, such that the user interfacing of the invention may be performed by, supported in or accessed via all of .NET's languages and services, and in other distributed computing frameworks as well.

UI for Digital Memories

Figure 2:
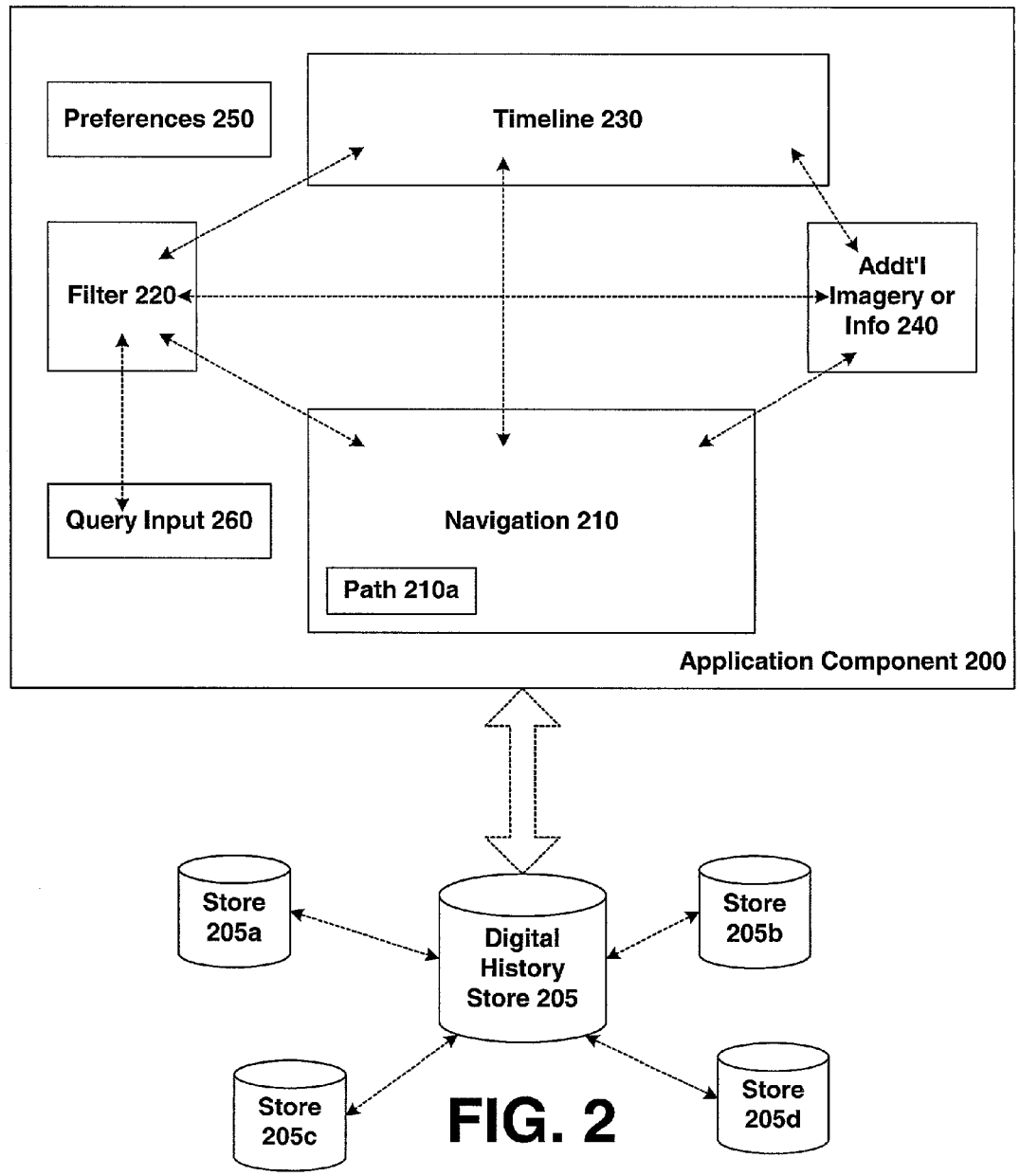
FIG. 2 illustrates an exemplary user interface having a timeline portion and navigation region in accordance with the present invention.

The user interface provided by the invention displays events, people, places and things in a way that enhances their relevance to the user. FIG. 2 illustrates some general elements that may be included in the display. As mentioned above, application component 200 is communicatively coupled to a database store 205 that has access to the user's digital historical data, which may be further found in stores 205a, 205b, 205c, 205d, etc., in a distributed manner as described earlier. Application component 200 includes one or more of a navigation region 210, a filter portion 220, a timeline portion 230, an additional information or imagery portion 240, preferences 250 and a query input portion 260. Navigation region 210 illustrates items, such as events, people, places and things, or clusters of items to which a user has currently navigated. Navigation region 210 may include a path portion 210a that indicates the current path to which the user has navigated. Timeline portion 230 illustrates a continuous time period of interest and items, such as events, people, places and things, associated with the time period of interest, based upon a user's navigation selection or preferences. Inputs to filter portion 220 may affect the display of the navigation region 210 or timeline portion 230. For example, if a user drags an item from the navigation region 210 to the filter portion 220, the displays of the timeline 230 and/or navigation region 210 filter upon one or more aspects of the dragged item. Based upon a users preferences, automatically or upon additional request, additional information or imagery may be displayed in portion 240 relating to an item. Preferences 250 may also be specified. Preferences include specifying default behavior for display, personal preferences for certain types of displayed items, preferences for the display of additional information or imagery, setting up notifications when the pattern of usage for an item changes, and so on. Query input portion 260 enables a user to filter based upon words, wherein semantic and/or other linguistic mapping techniques may be made to relate items to the input query.

The user interface provided by the application component 200 of the invention shows relevant information based on preferences and a timeline. The UI offers automatic, real-time referencing and correlation of content, which is then displayed on a timeline portion and within a navigation region. The timeline portion 230 and navigation region 210 display content elements based on frequency of use and relevance to the time being viewed, i.e., frequency and recency, as well as based on user preferences.

Figure 3:
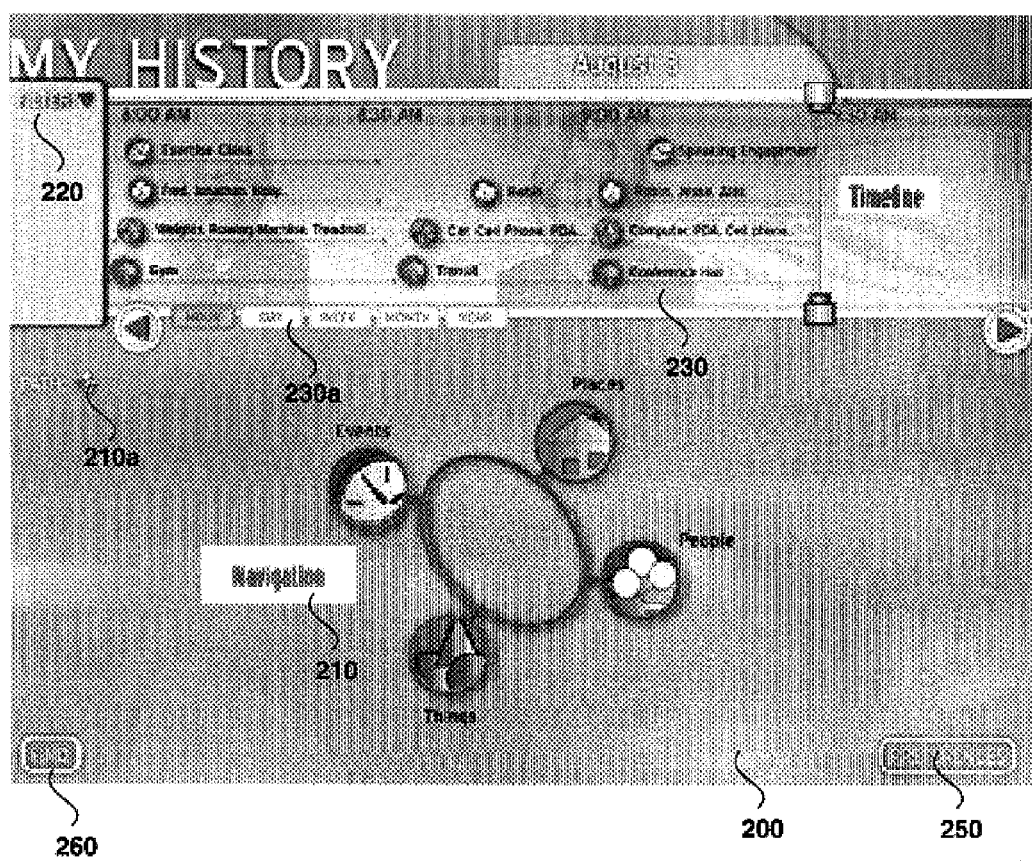
FIG. 3 illustrates an exemplary screenshot of a main user interface screen having a timeline portion, navigation portion, filter portion and sub navigation path in accordance with the user interface of the present invention.

FIGS. 3 through 9 illustrate exemplary screenshots having the elements of FIG. 2. FIG. 3 shows a main user interface with a timeline portion 230, navigation region 210, filter portion 220 and path indication 210a. Each user interface element has a unique identification that is given visual symbolic representation on the timeline 230 and in an interactive navigation region 210. Symbols can represent a cluster group of individual elements, such as events, musical instruments, etc. or an individual element such as guitar.

In more detail, the user interface is broken down into key components and elements that are shown in relevance to the timeline 230 for the time period illustrated. For example, events shown include an exercise class that is from 8 am to 8:30 am and a speaking engagement that begins at 9 am. People relevant to the timeline 230 include Fred, Jonathan, Holly, Robin, Jesse, etc. Things relevant to the timeline 230 include weights, a rowing machine, a treadmill, the user's car, the user's cell phone, the user's PDA, the user's computer, etc. Places relevant to the timeline 230 include the gymnasium, the transit line, the conference hall, etc. As illustrated, the events, people, places and things are distilled to the items relevant to the user for the time period shown based upon cross-correlative analysis. In the example shown, the events, people, places and things are displayed at an "hour" level of relevance, but based upon a user's input in portion 230a, the events, people, places and things can be displayed at any level of temporal generality including an hour view, day view, weekly view, monthly view, yearly view, etc.

Figure 4:
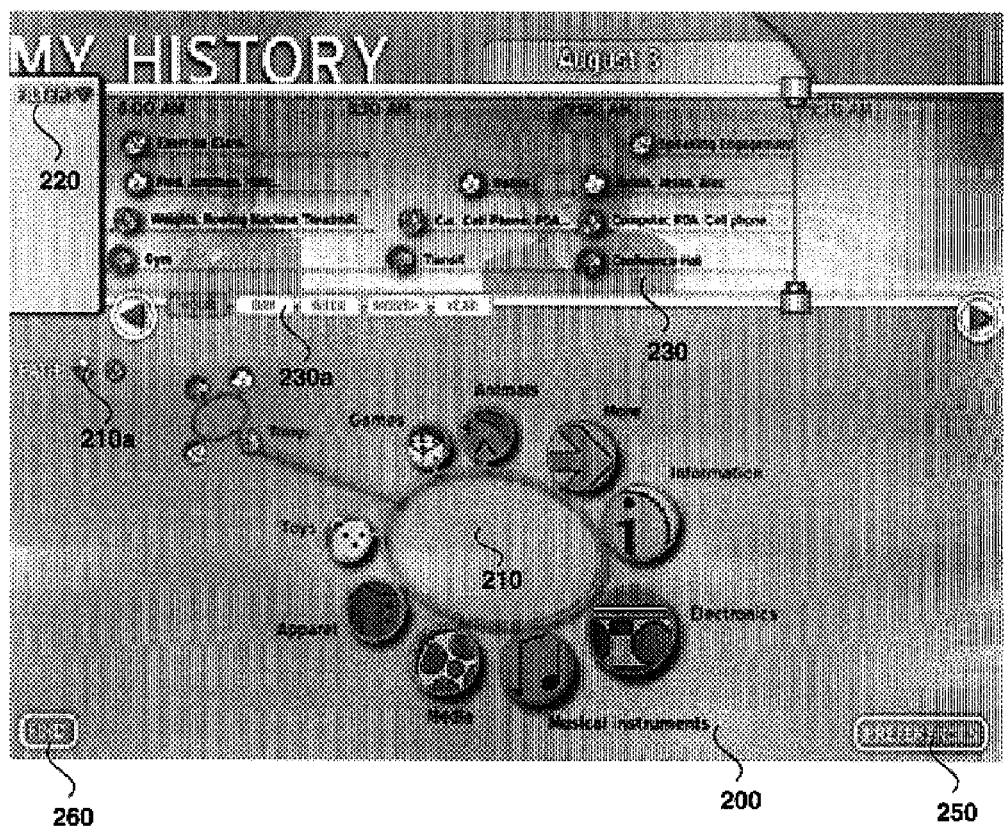
FIG. 4 illustrates an exemplary screenshot of the user interface showing how navigation of the invention exposes content of clusters of items.
Figure 5:
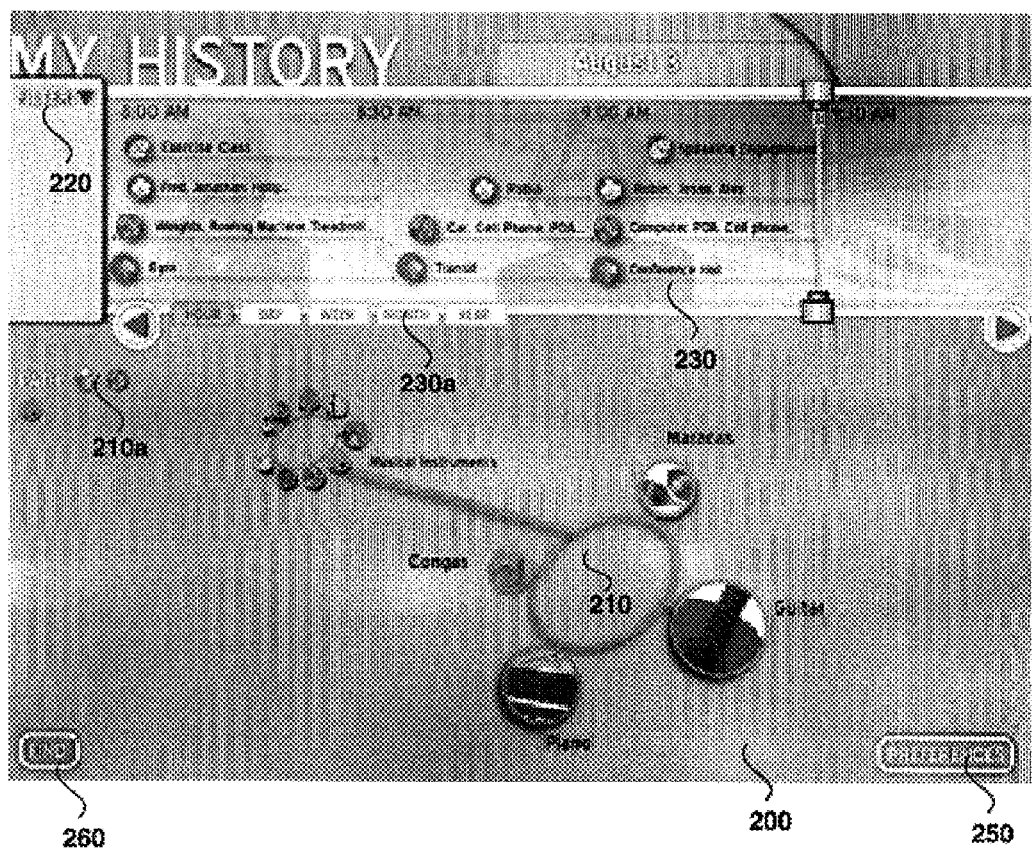
FIG. 5 illustrates an exemplary screenshot of the user interface showing how navigation of the invention navigates from clusters of items to individual items of the clusters.

Elements in the user interface are combined into clusters based on specific criteria including preferences 250 of the user. At the broadest level, clustered groups are uniquely organized into people, places, things and events, which have symbolic representation in the interface. In FIG. 4, a user has selected the things cluster, and thus the things associated with the displayed time period are exposed. In this case, games, toys, animals, apparel, media, musical instruments and electronics are the things exposed. To display more things, a user can click on the more element, and to see more information about the things, the user may select the information element. FIG. 5 illustrates the navigation region 210 of FIG. 4 after the user has further selected the musical instruments icon. In this case, individual elements congas, piano, maracas and guitar are displayed as the items constituting the musical instruments icon for the associated time period of the timeline 230. One can see that the path portion 210a grows in accordance with such a selection.

Elements are also sized according to their relative importance to the user. Items having frequent and/or recent activity are emphasized to reflect their relative weight for the time period reflected by the timeline 230. In FIG. 4, for example, games and toys may be depicted smaller, lighter and/or to the left due to lack of frequent or recent use while electronics may be depicted larger, darker and/or to the right because of frequent and/or recent use. If, however, the user began using games more often, then the games icon would appear bigger in the future. Or, if the timeline 230 were scoped to another part of history where the user utilized games more often, then the games icon would appear larger for that part of history reflected by the timeline 230. In FIG. 5, this relative weight concept is reflected by the user's heavy or recent use of the guitar and scant or non-recent use of the congas. There are also items that fall off the display altogether based upon lack of use and/or lack of recent use, reflecting the user's lack of interest in those elements for the time period illustrated by the timeline 230.

Thus, with respect to the navigation region 210, the central navigation shows clusters and individual items, similar to hierarchical computer interface navigation systems of today, where clusters can include subclusters and individual elements, e.g., folders and files. The present invention improves upon such a basic hierarchy by relating the clusters, subclusters, and individual elements within the navigation region 230 to the context of the timeline, and organizing the clusters, subclusters and individual elements based upon frequency and recency of use, and/or user preferences.

Figure 6:
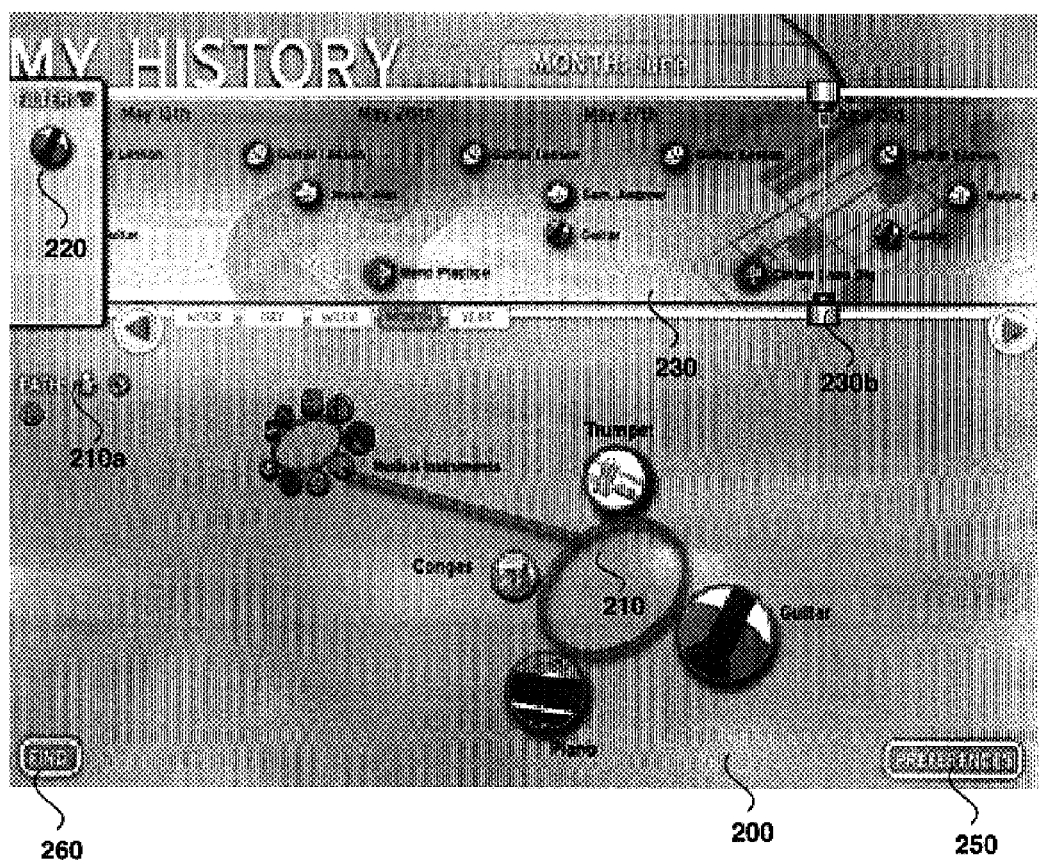
FIG. 6 illustrates an exemplary screenshot of the user interface showing a scrolling back operation of the timeline portion of the invention.

FIG. 6 illustrates an exemplary screenshot of the invention where the user has scrolled back three months with UI element 230b prior to the time period shown by FIGS. 3 through 5. It is noted that while the scope of path navigation 210a has not changed, the items in the navigation region 210 and on the timeline 230 are different than in FIG. 5. It is noted that the congas icon is darker on the navigation ring because it was used more recently in relationship to the timeline, the maracas icon has dropped off entirely because the first time they were used was after the current point in the timeline being displayed, and the trumpet icon which previously was not displayed is now present because of its relevancy to the timeline 230 at the new time period of interest.

Figure 7:
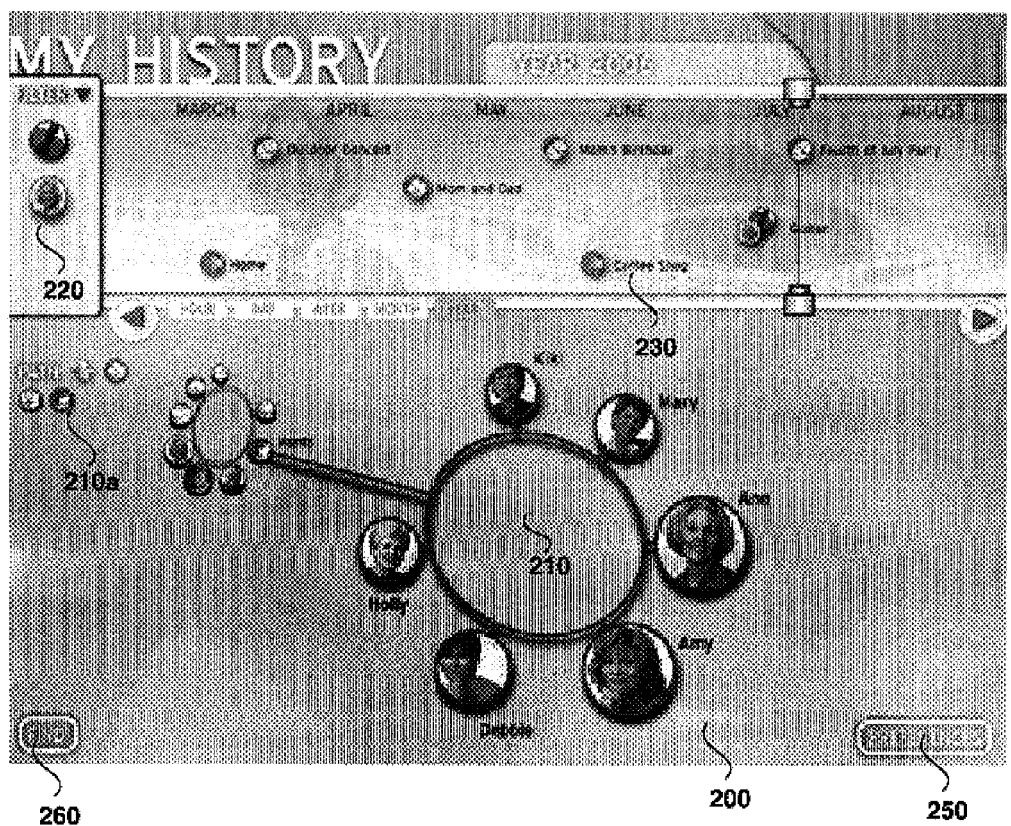
FIG. 7 illustrates an exemplary screenshot of the user interface showing exemplary path/sub-path navigation of the invention.

Levels of navigation of the navigation region 210 reflected by the user's navigation choices are exposed to the user via a path or sub-navigation portion 210a. Representation 210a of the navigation system stays in context with where the user currently is in the navigation system, showing a path or hierarchical structure of clusters relevant to user choices. Every time a choice is made for a cluster, the chosen cluster is added to the path portion 210a. At anytime, the user can choose a cluster in the path 210a, and the main navigation 210 will reflect the choice and show that cluster and its sub clusters. For example, this is shown in FIG. 7 where a user has selected the "Aunts" icon from the path 210a, thereby displaying the user's Aunts.

Figure 8:
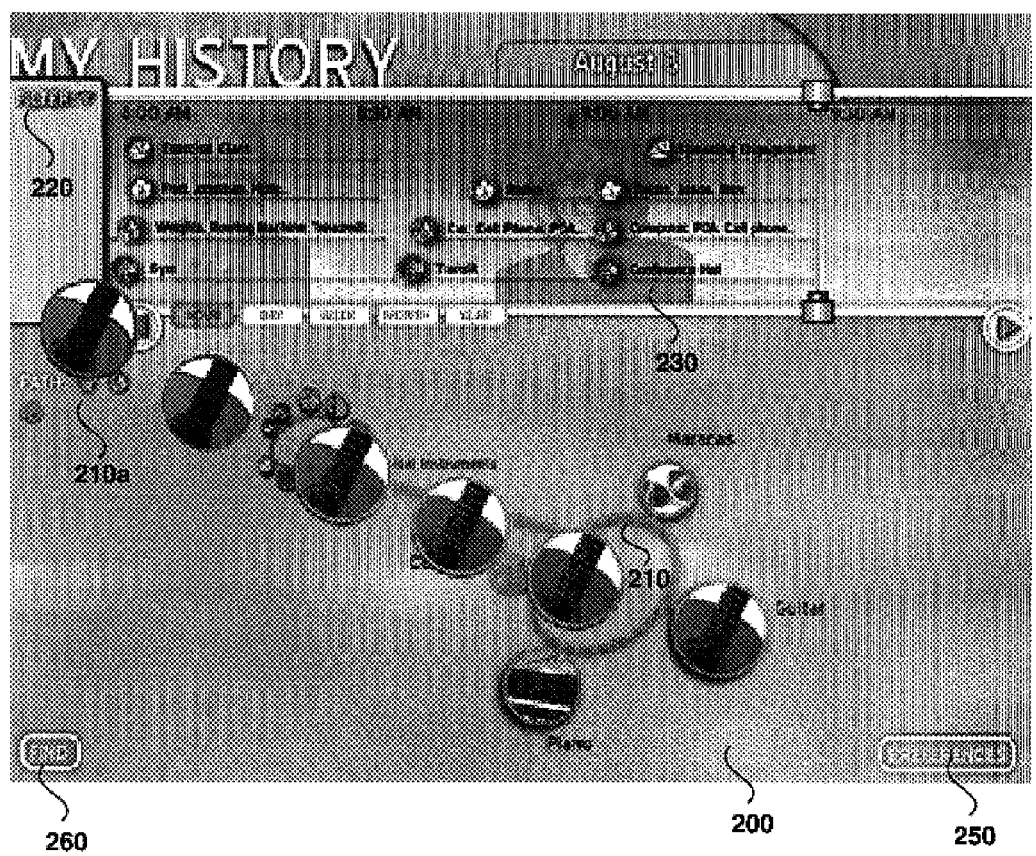
FIG. 8 illustrates an exemplary screenshot of the user interface showing exemplary dragging and resultant filtering in accordance with the invention.
Figure 9:
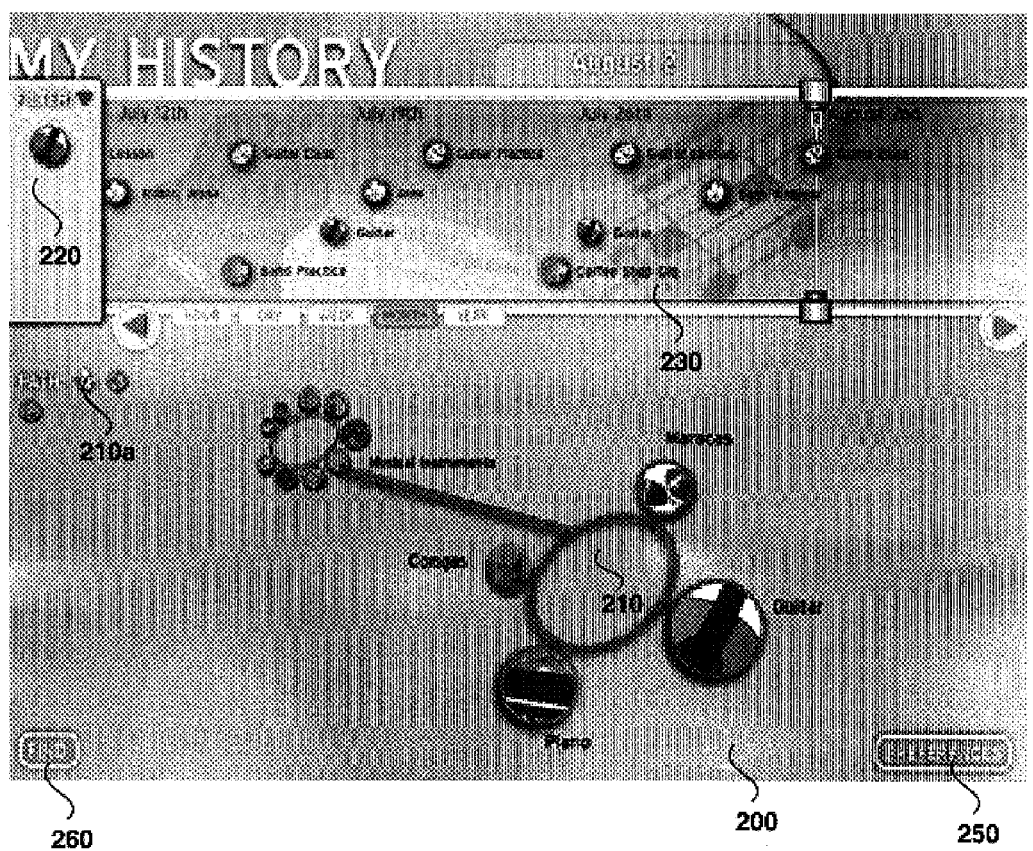
FIG. 9 illustrates an exemplary screenshot of the user interface showing exemplary scoping and filtering of a timeline portion according to a selected object in accordance with the present invention.

As shown in the exemplary screenshots of FIGS. 8 and 9, a user can use symbols/images that represent unique elements in the user interface as criteria for searching/filtering, as opposed to using only text representing content. Elements in the navigation region 210 can be dragged to the filter 220, affecting the display of the timeline 230. The timeline 230 then filters using the element, or elements, to show the last time the element(s) were relevant in time along with the N prior times showing a total of N+1 instances of the element (s) being relevant to the timeline 230. If the timeline 230 had been in an hour view via portion 230a and the element(s) were not relevant N+1 times in the hour view, the timeline 230 chooses the appropriate time, hour, day, week, month or year view automatically. If there are not N+1 relevant times, the timeline 230 displays whatever elements are available for the filtering criteria. In a non-limiting exemplary embodiment, N is 10.

A user can also search for relevant clusters, elements and items based upon a query input portion 260. In that case, the elements in navigation region 210 and timeline 230 are filtered based upon items that turn up based upon known semantic and linguistic mapping techniques. For example, a user could input "grandpa's pocketwatch," and the mapping techniques will lead filtering based on items relating to grandpa and pocketwatch.

As mentioned above, while exemplary embodiments of the present invention have been described in connection with various computing devices and network architectures, the underlying concepts may be applied to any computing device or system in which it is desirable to provide the ability for a user to interact with a digital history store. Thus, the techniques for interfacing with a digital history store in accordance with the present invention may be applied to a variety of applications and devices. For instance, the user interface component of the invention may be applied to the operating system of a computing device, provided as a separate object on the device, as part of another object, as a downloadable object from a server, as a "middle man" between a device or object and the network, as a distributed object, etc. For example, the UI component of the invention could be built into the MICROSOFT WINDOWS® OS platforms as part of the "my docs" folder, "my photos" folder, and so on. While exemplary programming languages, names and examples are chosen herein as representative of various choices, these languages, names and examples are not intended to be limiting.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CDROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the managing techniques of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the user interface as described in exemplary embodiments above, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for displaying elements from a user's digital history store on a timeline, comprising:
    selecting a time period of interest from a plurality of time periods on the timeline;
    displaying from the user's digital history store on the timeline elements associated with events, people, places and things relating to the time period of interest, wherein each event, person, place and thing has a unique icon associated therewith;
    displaying in a navigation region a root navigation region displaying icons for events, people, places and things; and
    in response to selecting one of the events, people, places and things icons in the root navigation region, displaying a cluster of one of events, people, places and things corresponding to the selection and relating to the time period of interest.

2. A method according to claim 1, wherein said displaying includes placing emphasis on elements of the cluster based upon at least one of (1) recency of activity associated therewith, (2) frequency of activity associated therewith and (3) user preferences.

3. A method according to claim 2, wherein said placing emphasis includes at least one of changing the size of the icon, changing a contrast associated with the icon and positioning the icon according to a direction of emphasis.

4. A method according to claim 1, further including:
    in response to selecting one of the elements of the cluster, displaying a sub-cluster of elements of which the cluster is comprised, wherein the sub-cluster of elements relate to the time period of interest.

5. A method according to claim 1, wherein selecting in the navigating region includes displaying in a path display portion a currently navigated path by the user from root region to individual elements, including intervening selected clusters.

6. A method according to claim 1, further including:
    dragging an element from the navigation region to a filter region; and
    in response to the dragging, filtering the elements displayed in the timeline according to the dragged element.

7. A method according to claim 1, further including:
    inputting text to a query input portion; and
    in response to the inputting, filtering the elements displayed in the timeline according to the elements mapped to the text.

8. A method according to claim 1, further including:
    inputting user preference information for pre-specified aspects of said displaying.

9. A method according to claim 1, further including:
    in response to a user selection, displaying additional information about the displayed icons.

10. A method according to claim 1, wherein the time period of interest is selected from one of a range of at least one hour, a range of at least one day, a range of at least one week, a range of at least one month and a range of at least one year.

11. A method according to claim 1, wherein said selecting a time period of interest includes scoping to a time period of interest with a scoping mechanism.

12. A method according to claim 11, wherein the scoping mechanism is a scroll bar.

13. A computer readable medium having stored thereon a plurality of computer-executable instructions for performing the method of claim 1.

14. A modulated data signal carrying computer executable instructions for performing the method of claim 1.

15. A computing device comprising means for performing the method of claim 1.

16. A computer readable medium having stored thereon a plurality of computer-executable modules for displaying elements from a user's digital history store on a timeline, the computer executable modules comprising:
    a selecting mechanism for selecting a time period of interest from a plurality of time periods on the timeline;
    a display mechanism that displays events, people, places and things directly relating to the time period of interest from the user's digital history store on the timeline wherein said display mechanism further displays in a navigation region a root navigation region displaying icons for events, people, places and things; and
    in response to selecting one of the events, people, places and things icons in the root navigation region, said display mechanism displays a cluster of one of events, people, places and things corresponding to the selection and relating to the time period of interest.

17. A computer readable medium according to claim 16, wherein said display mechanism places emphasis on elements of the cluster based upon at least one of (1) recency of activity associated therewith, (2) frequency of activity associated therewith and (3) user preferences.

18. A computer readable medium according to claim 17, wherein said display mechanism at least one of changes the size of the icon, changes a contrast associated with the icon and positions the icon according to a direction of emphasis.

19. A computer readable medium according to claim 16, further including:
    in response to selecting one of the elements of the cluster, said display mechanism displays a sub-cluster of elements of which the cluster is comprised, wherein the sub-cluster of elements relate to the time period of interest.

20. A computer readable medium according to claim 16, wherein in response to selecting in the navigating region, said display mechanism displays in a path display portion a currently navigated path from root region to individual elements, including intervening selected clusters.

21. A computer readable medium according to claim 16, further including:
a filter mechanism, whereby in response to dragging an element from the navigation region to a filter region, the display mechanism filters the elements displayed in the timeline according to the dragged element.

22. A computer readable medium according to claim 16, further including:
a filter mechanism, whereby in response to text input to a query input portion, the display mechanism filters the elements displayed in the timeline based on the input text.

23. A computer readable medium according to claim 16, further including: a user preference input mechanism for receiving user preference information for specifying aspects of said displaying by the display mechanism.

24. A computer readable medium according to claim 16, wherein in response to a user selection, said display mechanism displays additional information about the displayed icons.

25. A computer readable medium according to claim 16, wherein the time period of interest is selected from one of a range of at least one hour a range of at least one day, a range of at least one week, a range of at least one month and a range of at least one year.

26. A computer readable medium according to claim 16, wherein said selecting mechanism includes a scoping mechanism for scoping to a time period of interest.

27. A computer readable medium according to claim 26, wherein the scoping mechanism is a scroll bar.

28. A modulated data signal carrying computer executable instructions output as a result of the execution of the plurality of computer-executable instructions of the computer readable medium of claim 16.

29. A computing device comprising means for carrying out the plurality of computer-executable instructions of the computer readable medium of claim 16.

30. A computing device for having a display for displaying elements from a user's digital history store on a timeline, comprising:
a selecting mechanism for selecting a time period of interest from a plurality of time periods on the timeline;
a display mechanism that displays events, people, places and things directly relating to the time period of interest from the user's digital history store on the timeline wherein said display mechanism further displays in a navigation region a root navigation region displaying icons for events, people, places and things; and
in response to selecting one of the events, people, places and things icons in the root navigation region, said display mechanism displays a cluster of one of events, people, places and things corresponding to the selection and relating to the time period of interest.

31. A computing device according to claim 30, wherein said display mechanism places emphasis on elements of the cluster based upon at least one of (1) recency of activity associated therewith, (2) frequency of activity associated therewith and (3) user preferences.

32. A computing device according to claim 31, wherein said display mechanism at least one of changes the size of the icon, changes a contrast associated with the icon and positions the icon according to a direction of emphasis.

33. A computing device according to claim 30, further including in response to selecting one of the elements of the cluster, said display mechanism displays a sub-cluster of elements of which the cluster is comprised, wherein the sub-cluster of elements relate to the time period of interest.

34. A computing device according to claim 30, wherein in response to selecting in the navigating region, said display mechanism displays in a path display portion a currently navigated path from root region to individual elements, including intervening selected clusters.

35. A computing device according to claim 30, further including:
a filter mechanism, whereby in response to dragging an element from the navigation region to a filter region, the display mechanism filters the elements displayed in the timeline according to the dragged element.

36. A computing device according to claim 30, further including:
a filter mechanism, whereby in response to text input to a query input portion, the display mechanism filters the elements displayed in the timeline based on the input text.

37. A computing device according to claim 30, further including:
a user preference input mechanism for receiving user preference information for specifying aspects of said displaying by the display mechanism.

38. A computing device according to claim 30, wherein in response to a user selection, said display mechanism displays additional information about the displayed icons.

39. A computing device according to claim 30, wherein the time period of interest is selected from one of a range of at least one hour, a range of at least one day, a range of at least one week, a range of at least one month and a range of at least one year.

40. A computing device according to claim 30, wherein said selecting mechanism includes a scoping mechanism for scoping to a time period of interest.

41. A computing device according to claim 30, wherein the scoping mechanism is a scroll bar.

* * * * *